(12) United States Patent
Kolych et al.

(10) Patent No.: US 12,372,602 B2
(45) Date of Patent: Jul. 29, 2025

(54) RADIO FREQUENCY SENSING AND LOCALIZATION OF OBJECTS

(71) Applicant: Cypress Semiconductor Corporation, San Jose, CA (US)

(72) Inventors: Igor Kolych, Lviv (UA); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 481 days.

(21) Appl. No.: 17/965,679

(22) Filed: Oct. 13, 2022

(65) Prior Publication Data

US 2024/0125882 A1  Apr. 18, 2024

(51) Int. Cl.
*G01S 5/02*  (2010.01)
*G01S 5/06*  (2006.01)

(52) U.S. Cl.
CPC .......... *G01S 5/0218* (2020.05); *G01S 5/0273* (2013.01); *G01S 5/06* (2013.01)

(58) Field of Classification Search
CPC ........ G01S 13/931; G01S 7/539; G01S 7/352; G01S 13/343; G01S 13/584; G01S 7/356; G01S 7/41; G01S 7/415; G01S 2013/462; G01S 5/0218; G01S 5/0273; G01S 7/285; G01S 13/04; G01S 5/06
See application file for complete search history.

(56) References Cited

U.S. PATENT DOCUMENTS

| | | | |
|---|---|---|---|
| 2011/0074620 A1* | 3/2011 | Wintermantel | G01S 7/0233 342/70 |
| 2022/0171049 A1* | 6/2022 | Wu | G01S 13/34 |
| 2022/0214425 A1* | 7/2022 | Yoffe | G01S 13/584 |

* cited by examiner

*Primary Examiner* — Olumide Ajibade Akonai

(57) ABSTRACT

A device includes a transmitter coupled to an antenna, a receiver coupled to the at least one antenna, and a processing device to: cause the transmitter to radiate a radio frequency (RF) signal; receive, via the receiver, a reflective RF signal based on the radiated RF signal; detect, within a data array of the reflective RF signal, a maximum peak among a plurality of signal peaks, the maximum peak being indicative of a first distance to a first object relative to the at least one antenna; and cancel, using cascading peak cancellation on the spectrum, the maximum peak while detecting a first next-highest peak of the plurality of signal peaks compared to the maximum peak, the first next-highest peak being indicative of a second distance to a second object.

20 Claims, 9 Drawing Sheets

RADIO FREQUENCY SENSING AND LOCALIZATION OF OBJECTS

TECHNICAL FIELD

This disclosure relates to wireless devices and, more specifically, to radio frequency sensing and localization of objects.

BACKGROUND

Radio frequency (RF) sensing and localization is employed in many applications and, in particular, can be employed by wireless devices. Typically, such localization relates to localization of wireless devices configured with Wi-Fi™ technology or IEEE 802.11 standards, but can also relate to wireless devices communicating over other wireless local-area network (WLAN) or Personal Area Network (PAN) technologies, to include Bluetooth® (BT), Bluetooth® Low Energy (BLE), Zigbee®, infrared, and the like. In some cases, such wireless devices can employ such PAN technologies (e.g., Wi-Fi™) as a radar device that is able to detect other objects, to include people.

DETAILED DESCRIPTION

Figure 1A:
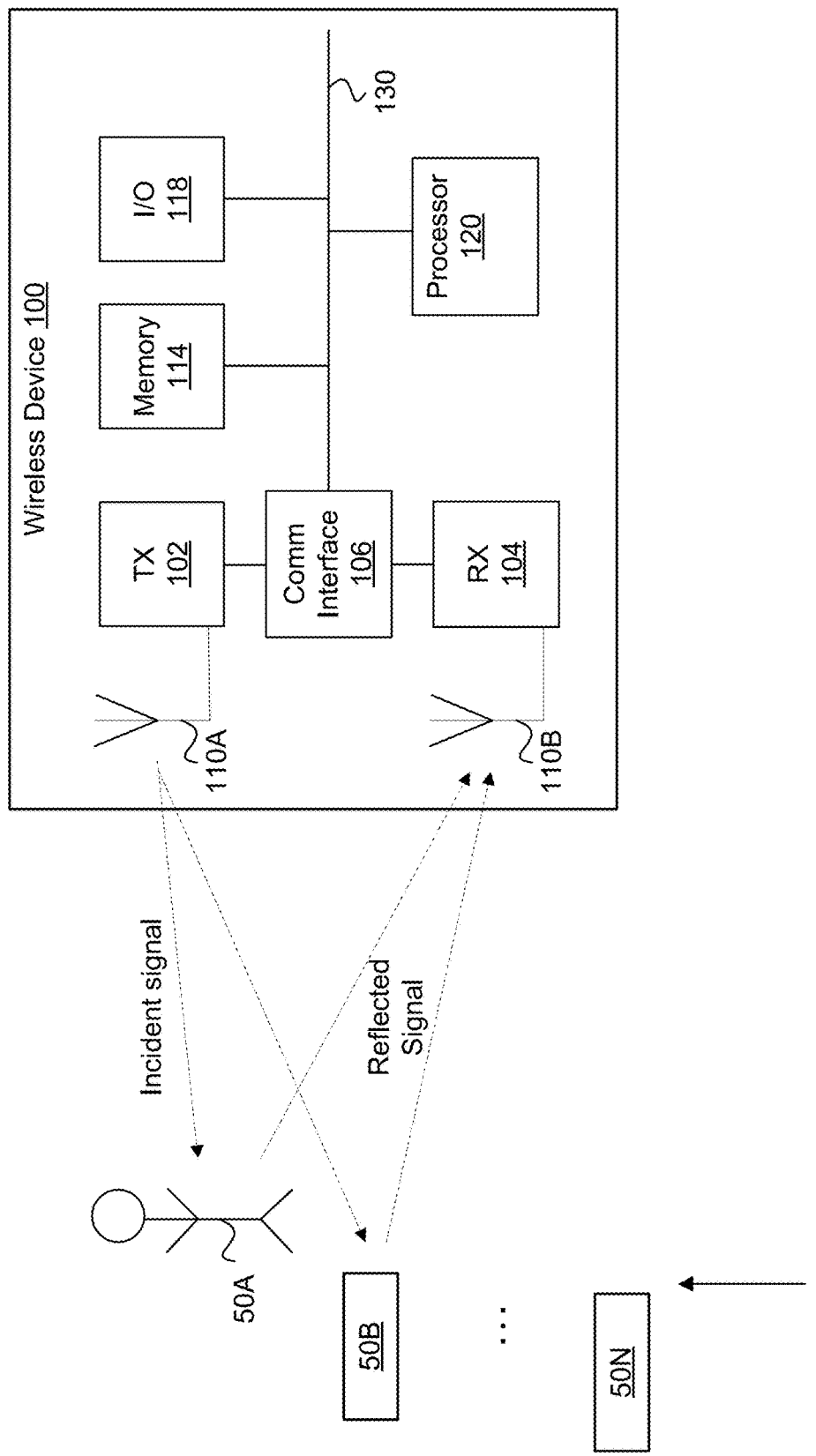
FIG. 1A is a block diagram of an exemplary wireless device configured for RF sensing and localization of passive objects according to an example embodiment.

The following description sets forth numerous specific details such as examples of specific systems, devices, components, methods, and so forth, in order to provide a good understanding of various embodiments of radio frequency (RF) sensing and localization of objects. A common way to detect several objects in order to perform localization is by thresholding single dimensional or two dimensional data collected from RF signals that reflect off of objects and surfaces within an environment of a wireless device. The threshold method can be adaptive to a certain extent, but still includes various disadvantages. One disadvantage is having low resolution, making it difficult to distinguish a single peak or multiple peaks caused by multiple objects or by multipath distances to a single object. Further, thresholding does not take into account methods of constructing heat maps or spectrums using a cross-correlation algorithm or a signal classification algorithm, or the like, to the reflective RF signal. Other possible approaches to localization such as subtracting the reflective signal from the original (radiated) signal risks creating artificial peaks in the spectrum or heat map. Further, performing correlation with a template or using neural networks is computationally complex and thus not viable for many wireless devices or systems.

To resolve these and other deficiencies with known approaches to object detection and localization, the present disclosure sets forth configuring and/or operating wireless devices to implement cascading peak (or notch) cancellation of a maximum peak while detecting a next-highest peak, for example. By cancelling the current maximum peak within the RF spectrum of a reflective signal enables better detection of successively next-highest peaks, each of which may correlate to a separate object or to multipath distances associated with a single object.

In some embodiments, a processing device of a wireless device causes a transmitter to radiate a radio frequency (RF) signal and receives, via a receiver, a reflective RF signal based on the radiated RF signal. In these embodiments, the processing device further detects, within a data array of the reflective RF signal, a maximum peak among multiple signal peaks. The data array can be in the form of a one-dimensional spectrum or a two-dimensional heat map, as will be discussed in more detail. The maximum peak is indicative of a first distance to a first object relative to at least one antenna of the wireless device. Alternatively, the wireless device is able to transmit RF signals and receive the RF signals that are returned by an active wireless device, which may be retained by a passive object. In this embodiment, multiple peaks are caused by multiple paths that reflect off of reflective or conductive surfaces. In various embodiments, the data array is detected using a cross-correlation algorithm such as Generalized Cross-Correlation (GCC) or Inverse Fast Fourier Transform (IFFT), or a signal classification algorithm such as Multiple Signal Classification (MUSIC).

In these embodiments, the processing device can employ a detection function to detect the maximum peak, and then a revised (or updated) detection function to detect additional peaks. The processing device further cancels, using cascading peak cancellation on the data array, the maximum peak while detecting a first next-highest peak of the multiple signal peaks compared to the maximum peak. The first next-highest peak is indicative of a second distance to a second object or a second path distance to the first object. This object detection can be integrated within or supportive to location tracking of one or more objects, where the objects are either active (e.g., RF wireless devices) or passive (e.g., non-radiating objects).

The present disclosure includes a number of advantages, including the ability to accurately detect and track the locations of multiple objects and/or wireless devices in an environment of a detecting RF wireless device. Further, the ability to leverage cross-correlation algorithms, signal classification algorithms, or the like (which will be discussed) enables use of heat maps and spectrum (data arrays) that contain accurate location-specific data. Use of these types of algorithms and corresponding data may further enable differentiating the detection of multiple objects or of multipath distances to a single object, thus understanding what and how many objects are being detected. Use of these types of algorithms and corresponding data may further enable correcting peak locations that are detected, e.g., to resolve cases of non-ideal frequencies where intermediate peaks should be shifted before, for example, scanning frequencies for phase ranging. One such example of scanning is that of BLE channel detection for phase ranging to perform BLE localization. Location tracking using disclosed methods may further enable correcting the actual position of a wireless device or object. Additional advantages will be apparent to those skilled in the art of object detection and localization.

FIG. 1A is a block diagram of an exemplary wireless device 100 configured for RF sensing and localization of passive objects according to an example embodiment. In at least some embodiments, the wireless device 100 includes, but is not be limited to, a transmitter 102 or TX (e.g., a PAN transmitter), a receiver 104 or RX (e.g., a PAN receiver), a communications interface 106, a TX antenna 110A coupled to the transmitter 102, an RX antenna 110B coupled to the receiver 104, a memory 114, one or more input/output (I/O) devices 118 (such as a display screen, a touch screen, a keypad, and the like), and a processor 120. These components can all be coupled to a communications bus 130. In some embodiments, aspects of the communication interface 106 work with the processor 120 to perform operations or that function as a processing device of the wireless device 100. In some embodiments, there is a single antenna and multiplexing logic to switch use of the antenna between the TX and RX (see FIG. 1B).

In at least some embodiments, the memory 114 includes storage to store instructions executable by the processor 120 and/or data generated by the communication interface 106. In various embodiments, frontend components such as the transmitter 102, the receiver 104, the communication interface 106, and the one or more antenna 110 described herein within various devices are adapted with or configured for WLAN and PAN-based frequency bands, e.g., Bluetooth® (BT), BLE, Wi-Fi™, Zigbee®, Z-Wave™, and the like.

In various embodiments, the communications interface 106 is integrated with the transmitter 102 and the receiver 104, e.g., as a frontend of the wireless device 101. The communication interface 106 may coordinate, as directed by the processor 120, to request/receive packets from other wireless devices or those that reflective off of objects. The communications interface 106 can further process data symbols received by the receiver 104 in a way that the processor 120 can perform further processing, including object detection and location tracking, as will be discussed in detail. In some embodiments, the processing may process an RF signal spectrum or heat map (e.g., data arrays) in order to make sense of particular RF signals referred to as channel state information (CSI) and/or return signal strength information (RSSI), which include channel properties of a communication link. The CSI/RSSI data, for example, describes how a signal propagates from the transmitter 102 to the receiver 104 and represents the combined effect of, for example, scattering, fading, and power decay with distance. The method by which CSI is measured is called channel estimation.

In these embodiments, there may exist a number of objects 50 in the environment of and within RF range of the wireless device 100. The objects 50 can include humans 50A as well as other objects 50B-50N that are generally understood to be passive objects. The RF range may differ depending on the type of WAN or PAN technology being used at any given time by the wireless device 100. In some embodiments, the transmitter 102 radiates RF signals which cause reflections off of one or more of the objects 50, creating reflective RF signals received by the receiver 104 and that may include CSI/RSSI data.

In these embodiments, the wireless device 100 (also referred to herein as the detecting RF wireless device) can process data arrays of either the reflective RF signals or active RF signals (see FIG. 1B) to perform RF sensing to detect the presence of one or more of the object 50 and to determine a distance away from the wireless device 100, e.g., in relation to the RX antenna 110B. Determining the distance away may be understood as localization of the objects 50, which locations may be stored in the memory 114 and referenced at later times to aid in the disclosed algorithms and methods deployed to differentiate the objects 50 from each other, e.g., in order to accurately determine the number and type of objects detected.

Figure 1B:
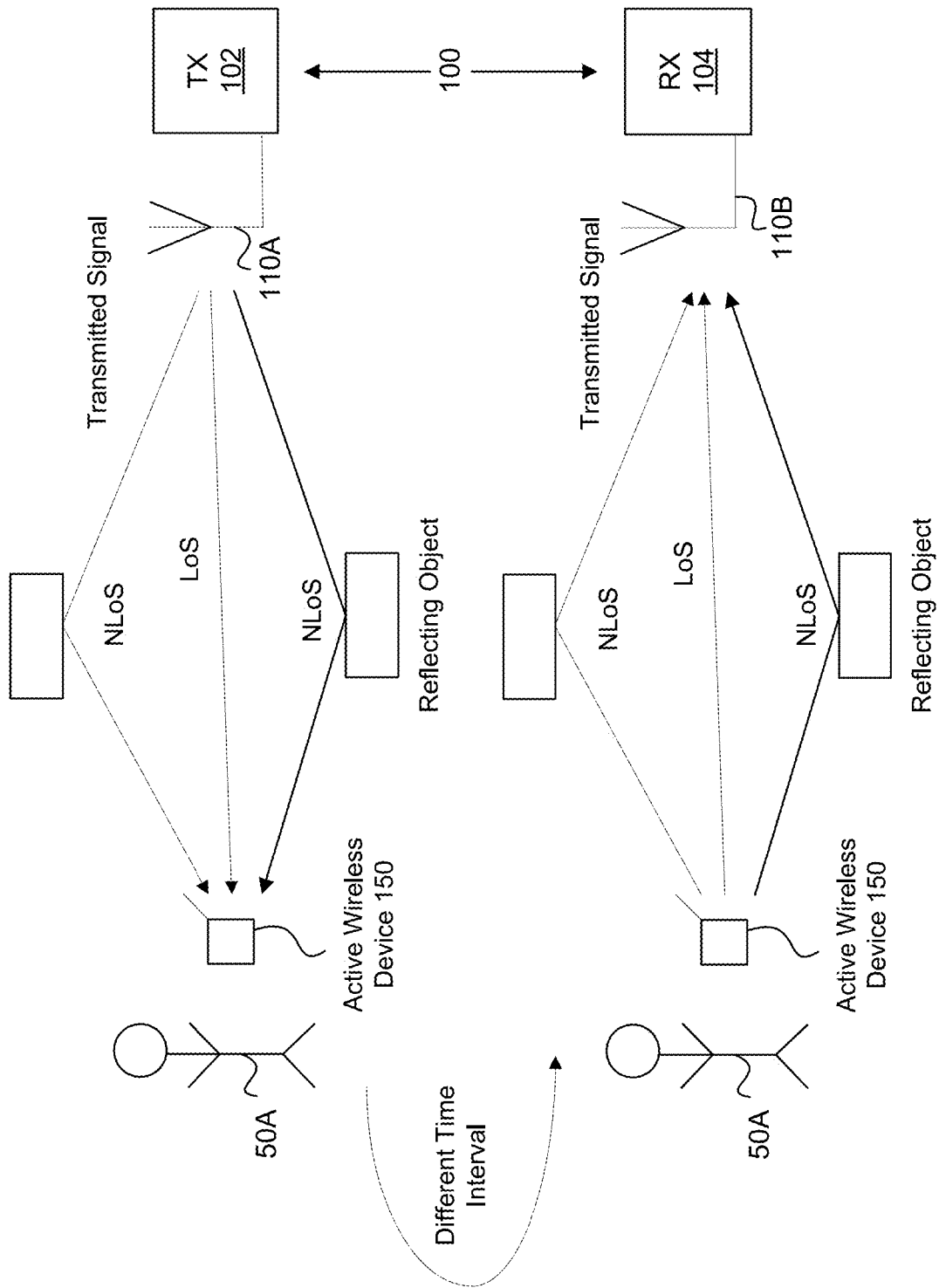
FIG. 1B is a block diagram of an exemplary wireless device configured for RF sensing and localization of objects having an active wireless device according to an example embodiment.

FIG. 1B is a block diagram of the wireless device 100 configured for RF sensing and localization of objects having an active wireless device 150 according to an example embodiment. In these embodiments, the wireless device 100 is capable of transmitting RF signals and detecting the RF signals returned by the active wireless device 150 in a different period of time. Similarly, the active wireless device 150 may perform the same operations with relation to the wireless device 100. Thus, one of the wireless device 100 or the active wireless device 150 functions as the initiator (or transmitter) of the RF signals and the other functions as a reflector (or re-transmitter), sending those RF signals back to the initiator device. For simplicity of explanation, assume that the wireless device 100 is the initiator wireless device and the active wireless device 150 (which may be housed in a passive object) is the reflector wireless device.

In embodiments, returning or re-transmitting the RF signals can be understood as transmitting the RF signals with the same phase (phase ranging) or after a dedicated period of time if the RF signals contain a collection of subcarriers. In this way, the returned RF signals are received by the initiator wireless device, e.g., the wireless device 100. The initiator wireless device may then compare the transmitted and received signals to generate a spectrum or heat map, which is used for distance (and velocity) estimation. Such approach is suitable for Wi-Fi and BLE applications. Actual distance between devices is determined by a line of sight (LoS) signal. The disclosed methods allow decomposing an RF signal that propagates directly (LoS) and that is reflected from other objects (NLoS). In other words, the disclosed methods decompose multipaths in respective LoS and NLoS components.

Figure 1D:
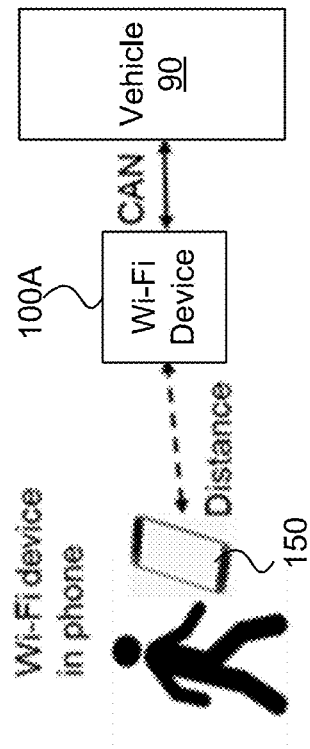
FIG. 1D is a simplified block diagram of a first wireless device detecting a distance to a second wireless device according to at least one embodiment.
Figure 1C:
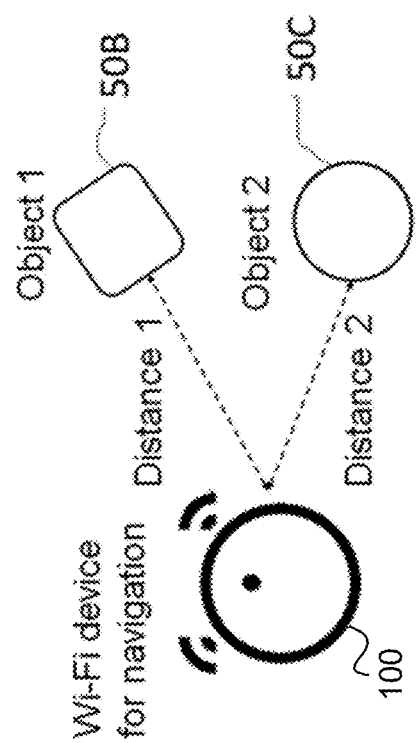
FIG. 1C is a simplified block diagram of a wireless device determining locations of multiple objects at different distances according to at least one embodiment.

FIG. 1C is a simplified block diagram of the wireless device 100 determining locations of multiple objects at different distances (or different path distances) according to at least one embodiment. For example, the wireless device 100 can determine the distance to each of two objects, a first object 50B at distance one ("1") and a second object 50C at distance two ("2"). Because these distances can differ, determining each distance and tracking the location of each of the first and second objects 50B and 50C can facilitate indoor navigation, e.g., movement in relation to known locations of these two objects. Also, the wireless device 100 may contain several receivers and/or transmitters in different places of the wireless device 100 that allows for localization.

FIG. 1D is a simplified block diagram of a first wireless device 100A detecting a distance to a second wireless device 150 according to at least one embodiment. The first wireless device 100A can transmit RF signals to the second wireless device 150 and receive the RF signals returned from the second wireless device 150 to determine the location of the second wireless device 150 in relation to the first wireless device 100A. Or, the same procedure can be performed by wireless device 150 because of similar capabilities of both devices. The first wireless device 100A can be a part of a controller area network (CAN), e.g., that might exist within a vehicle 90.

Figure 2:
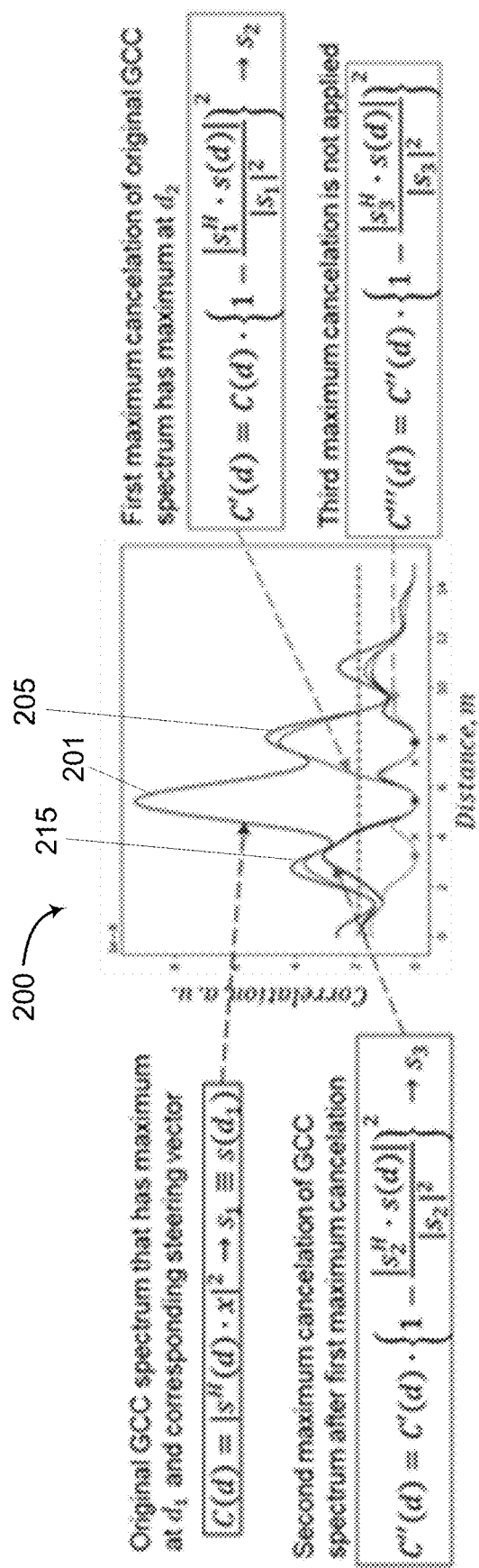
FIG. 2 is a graph illustrating implementation of cascading peak cancellation according to at least one embodiment.

FIG. 2 is a graph 200 illustrating implementation of cascading peak cancellation according to at least one embodiment. In various embodiments, the processing device of the wireless device 100 obtains the original data array from a reflective (or returned) RF signal by employing one of a cross-correlation algorithm (e.g., GCC or IFFT) or a signal classification algorithm (e.g., MUSIC). The processing device can generate the data array, from the reflective RF signal, where the data array includes information about a likelihood of objects being located at different distances (or different path distances) from the wireless device 100. The processing device can further detect, within the data array, by a detection function, a maximum peak among multiple signal peaks. The maximum peak may be indicative of a first distance to a first object relative to the at least one antenna or a first path distance in a multi-path situation (see FIG. 5).

Although different algorithms can be employed, for purposes of illustration herein, GCC is referred to, but the principles and techniques discussed herein are applicable to other cross-correlation or signal classification algorithms. These algorithms may calculate the likelihood that an object (e.g., the first object) is located at some distance, e.g., by maximizing Equation (1).

$$C(d) = |s^H(d) \cdot x|^2 \quad (1)$$

The maximum of this C(d) function may define a distance $d_1$ to the object, so, RF signal x has the best matching for steering vector $s_1 \equiv s(d_1)$. The distance ($d_1$) may correspond to a steering vector where function C(d) is at its maximum. The location detection and tracking described herein can be performed for two wireless devices by replacing a distance to an object with a distance of a path to a single object with an active device.

The processing device may then cancel, using cascading peak cancellation on the reflective RF signal, the maximum peak (e.g., located at $d_1$) while detecting a first next-highest peak of the multiple peaks in function C(d) compared to the maximum peak. The first next-highest peak is indicative of a second distance to a second object or a second path distance to the first object. The detection of multipath distances will be discussed in more detail with reference to FIG. 5.

More specifically, to search a next steering vector that has similar direction to x, $s_1$ should be taken into account and its weight w(d) should be removed from search set s(d) as $$w(d) = 1 - \frac{|s_1^H \cdot s(d)|}{|s_1|} \quad (2)$$

where H means conjugated and transposed. Further, a weighted steering vector may be generated that may be expressed as in Equation (3A).

$$s_w(d) = s(d) \cdot \left\{ 1 - \frac{|s_1^H \cdot s(d)|}{|s_1|} \right\} \quad (3A)$$

Different weights for steering vectors may advantageously be applied to determine likelihood data arrays, e.g., different from GCC, such as expressed in Equation (3B).

$$\left\{ 1 - \frac{|s_1^H \cdot s(d)|}{|s_1|} \right\} \rightarrow \left\{ 1 - \frac{|s_1^H \cdot s(d)|}{|s_1|} \right\}^{\frac{1}{2}} \quad (3B)$$

In some embodiments, to detect and cancel the maximum peak, the processing device is configured to locate the maximum peak by applying a first steering vector ($s_1$), within a first detection function C(d), to the reflective RF signal that generates the first distance ($d_1$). To locate the maximum peak, an argmax procedure can be used on C(d), where the argument is distance. In practice, C(d) is composed of two vectors, a C-vector and a corresponding d-vector. So, a max index of C(d) results in a corresponding distance d. The processing device may further determine the second distance ($d_2$) to the first next-highest peak using a second steering vector ($s_2$), within a second detection function C'(d), that also removes the maximum peak from the reflective RF signal, e.g., because determining the next-highest peak is more difficult with the maximum peak still present in the spectra.

In these embodiments, the spectra can be further searched with the second detection function of GCC, as illustrated in Equation (4). As can be observed, this second detection function C'(d) is the same as the first detection function (e.g., the first distance at the maximum) multiplied by the square (or other determined power) of the adjusted weight employed in the next steering vector for the cascading peak cancellation.

$$C'(d) =$$
$$|s_w^H(d) \cdot x|^2 = |s^H(d) \cdot x|^2 \cdot \left\{ 1 - \frac{|s_1^H \cdot s(d)|}{|s_1|} \right\}^2 = C(d) \cdot \left\{ 1 - \frac{|s_1^H \cdot s(d)|}{|s_1|} \right\}^2 \quad (4)$$

In at least some embodiments, to detect the first next-highest peak, the processing device is further to remove a weight associated with the first distance from a search set of the first steering vector to generate a weighted search set, Equation (3). The processing device may further integrate the weighted search set into the second steering vector to generate the second detection function, where the second detection function is equivalent to the first distance multiplied by the square of the weight (or other determined power of the weight), as illustrated in Equation (4). Equation (4) can then be employed iteratively to detect further next-highest peaks.

In various embodiments, the maxima search is performed in a cascading process that provides a set of distance $d_i$ and corresponding steering vectors $s_i$, e.g., where a third detection function may be expressed as in Equation (5). Equation (5), therefore, illustrates mathematical proof for iterative employment of Equation (4).

$$C''(d) =$$
$$C'(d) \cdot \left\{ 1 - \frac{|s_1^H \cdot s(d)|}{|s_1|} \right\}^2 = C(d) \cdot \left\{ 1 - \frac{|s_1^H \cdot s(d)|}{|s_1|} \right\}^2 \cdot \left\{ 1 - \frac{|s_1^H \cdot s(d)|}{|s_1|} \right\}^2 \quad (5)$$

From a numerical point of view, calculating the product between two steering vectors $\alpha(d_i, d_k)=|s^H(d_i)\cdot s(d_k)|$ for two distances may be defined by the difference between the two distances $\alpha(d_i, d_k)=\alpha(d_i-d_k)$. Thus, the processing device may determine $\alpha(d_i, d_k)$ once and then apply it multiple times to determine $|s^H(d_i)\cdot s(d_k)|$ for each iteration. If the set of steering vectors changes, then the processing device would have to recalculate $\alpha(d_i, d_k)$. In this way, each steering vector can be calculated values with some discretization and the processing device may use linear interpolation to find the correct value in some situations. Further, finding several maxima does not increase computation complexity.

In at least some embodiments, therefore, the processing device cancels, using the cascading peak cancellation, the first next-highest peak of the multiple peaks in function C(d) while detecting a second next-highest peak of the multiple peaks in function C(d). This follows performance of the cascading peak cancellation where each successively-lower peak is detected while cancelling the previously located maximum peak. The second next-highest peak, for example, is indicative of a third distance to a third object or a third path distance to the first object.

In these embodiments, to detect and cancel the first next-highest peak, the processing device can locate the first next-highest peak by applying the second steering vector, within the second detection function C'(d), to the reflective RF signal that correlates to the second distance. The processing device can further determine the third distance ($d_3$) to the second next-highest peak that correlates to a third steering vector ($s_3$), e.g., employed within a third detection function C"(d), and that removes the first next-highest peak from the spectrum or heat map of the reflective RF signal. In some embodiments, to detect the second next-highest peak, the processing device generates the third detection function by multiplying, by the first distance, a product of the square of a first steering vector used to determine the first distance and the square of a second steering vector used to determine the second distance. The third detection function may also be generated by multiplying, by the first distance, a difference between the second distance and the first distance, as was discussed previously.

Figure 3:
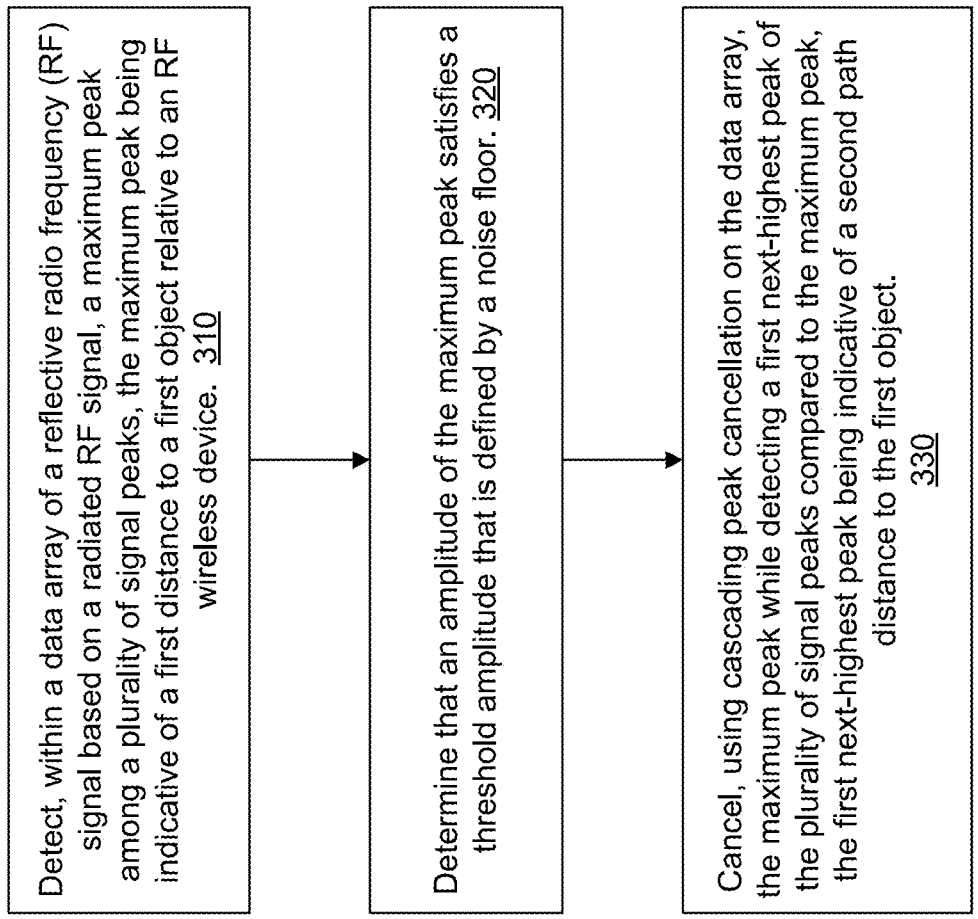
FIG. 3 is a flow diagram of a method of detecting objects or multipath distances to a single object according to an embodiment.

FIG. 3 is a flow diagram of a method 300 of detecting objects or multipath distances to a single object according to an embodiment. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the wireless device 100, to include the communication interface 106 and/or the processor 120 (e.g., processing device).

At operation 310, the processing logic detects, within a data array of a reflective radio frequency (RF) signal, a maximum peak among a plurality of signal peaks, the maximum peak being indicative of a first path distance to a first object relative to an RF wireless device. The reflective RF signal may be detected as a radiated RF signal that has bounced off of surfaces and returned to a radiating RF wireless device. Thus, the first path may be one of multiple paths reflective to or from the first object.

At operation 320, the processing logic determines that an amplitude of the maximum peak satisfies a threshold amplitude that is defined by a noise floor. Checking amplitude against a threshold amplitude will be discussed in more detail with reference to FIG. 4.

At operation 330, the processing logic cancels, using cascading peak cancellation on the data array, the maximum peak while detecting a first next-highest peak of the plurality of signal peaks compared to the maximum peak, the first next-highest peak being indicative of a second path distance to the first object.

Figure 4:
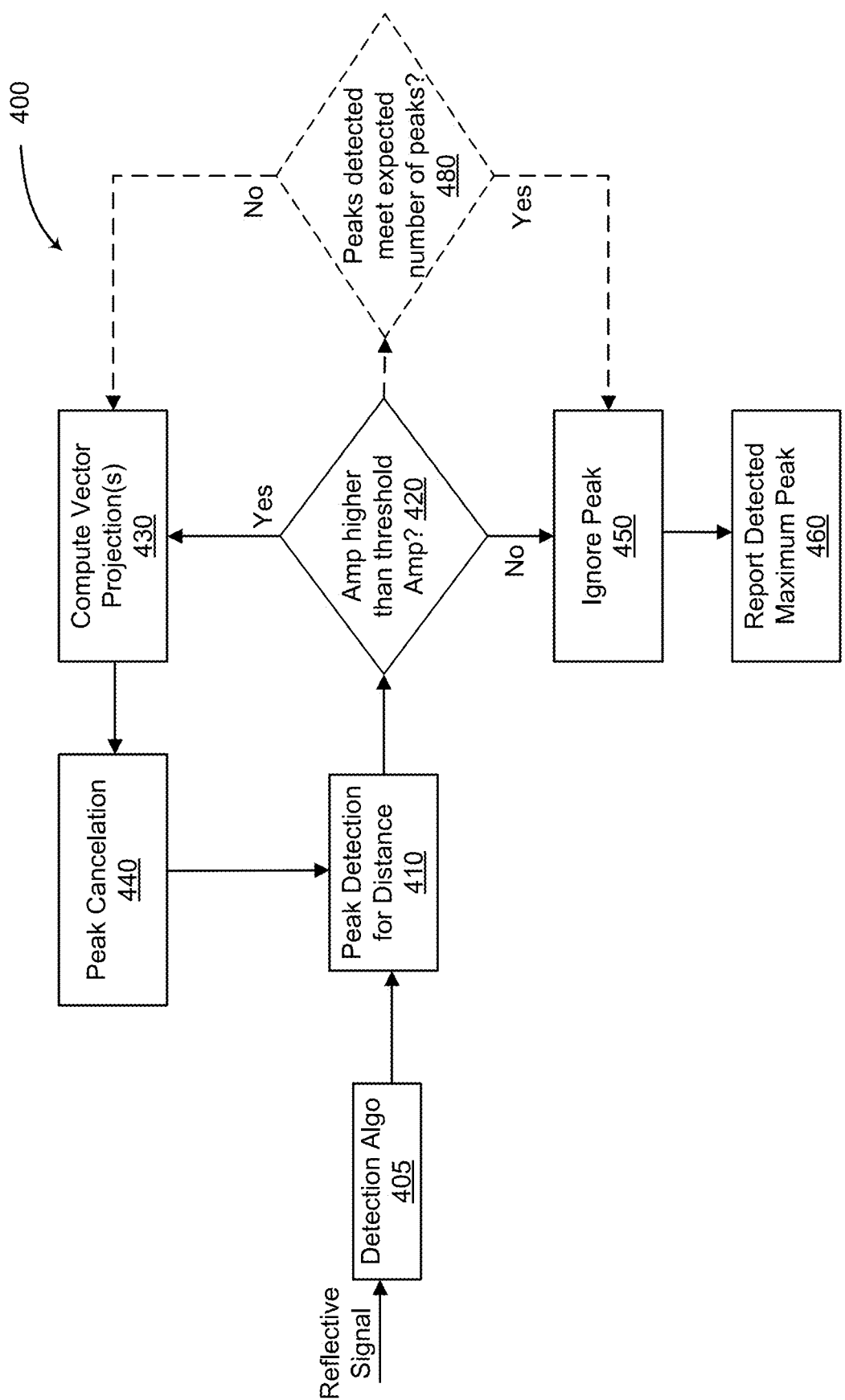
FIG. 4 is a flow diagram of a method of detecting objects or multipath distances to a single object according to various embodiments.

FIG. 4 is a flow diagram of a method 400 of detecting objects or multipath distances to a single object according to various embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the wireless device 100, to include the communication interface 106 and/or the processor 120 (e.g., processing device).

At operation 405, the processing logic performs a detection algorithm on a data array of the received RF signal, which in some embodiments of passive detecting, is a spectrum or heat map of a reflective RF signal. The detection algorithm may include one or more of GCC, IFFT, or MUSIC, for example. The GCC algorithm, for example, may generate a GCC spectrum containing multiple signal peaks. The processing logic may generate the data array from the reflective RF signal, e.g., as in detecting CSI and/or RSSI data.

At operation 410, the processing logic detects or otherwise identifies a maximum peak among the multiple peaks and determines a distance and/or velocity to the maximum peak. For example, this distance (or coordinates) may be $d_1$ in FIG. 2, or vi (velocity, or distance over time).

At operation 420, the processing logic begins cascading peak cancellation by determining whether the maximum peak has an amplitude that satisfies a threshold amplitude that is defined by a noise floor. Satisfying the threshold amplitude means at least meeting or exceeding that threshold amplitude. For an initial threshold amplitude, and in at least some embodiments, the threshold amplitude is defined as a relative to an absolute maximum amplitude from the data array generated at operation 405. Thus, for example, the threshold amplitude could be 10% 15%, 20%, 25%, or the like, of the maximum amplitude for the data array. These noise floor levers (or percentages) can be modified over time depending how sensitive the detection should be and/or how much noise is in the environment that should be filtered out.

At operation 430, in response to the amplitude satisfying the threshold amplitude, the processing device computes vector projections, e.g., the weight for the steering vector, e.g. $s_w(d)$. The initial weight may be calculated, as discussed with reference to FIG. 2, as $\alpha(d_i-d_k)=|s^H(d_i)\cdot s(d_k)|$ that should be done for a single spectrum or heat map, and can be applied to each cancellation iteration.

At operation 440, the processing logic performs peak cancellation, e.g., by applying successively computed detection functions (C(d), C'(d), C"(d), . . . ) that employ these successively computed steering vectors, $s_w(d)$, using the vector projections calculated in operation 430. This cancellation provides an iterative modification to the RF data array, where at each iteration, the maximum peak of the multiple signal peaks is cancelled, e.g., so that each successively next-highest peak can more easily be detected.

Figure 5:
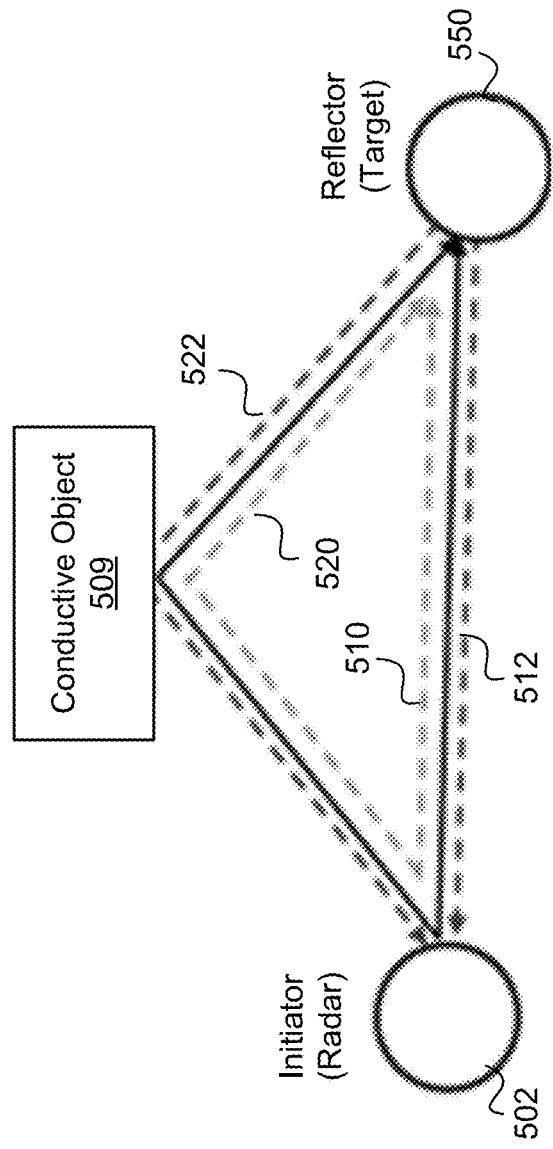
FIG. 5 is a simplified diagram illustrating the generation of multipath distances due to reflection of RF signals from conductive object(s) according to an embodiment.

Because of the cascading cancellation process, the method 400 can detect multiple peaks that are caused by reflecting from multiple objects even if a reflected signal propagates by multipath (line-of-sight and secondary reflections) (see FIG. 5). This application is similar to a radar. In other embodiments, the returned signal comes from an active device that propagates by multipath (line-of-sight and reflections). Such approach is considered for localization application (e.g., BLE channel detection or localization, Wi-Fi ranging).

The method 400 continues to loop through cascading peak cancellation, repeating operations 410, 420, 430, and 440, e.g., to cancel and detect subsequent next-highest peaks of the multiple peaks within the data array, e.g., of the received RF signal(s), until the next-highest peak drops below (and therefore does not satisfy) the threshold amplitude at operation 420.

At operation 450, in response to the amplitude of the maximum or next-highest peak not satisfying the threshold amplitude, the processing logic ignores that maximum or next-highest peak and terminates the cascading peak cancellation. This is the case for the third maximum cancelation illustrated in FIG. 2 with reference to C'''(d), which dropped below the threshold amplitude (illustrated in dotted line).

At operation 460, the processing logic reports the maximum peak (or last next-highest peak) that was detected as correlating to the detected distance to that maximum (or last next-highest peak). Indeed, the distance and/or velocity of each maximum or highest peak that was detected may, in turn, be reported.

In at least some embodiments, as indicated in dashed lines, a further inquiry can be performed in addition to or in lieu of the threshold amplitude inquiry at operation 420. This inquiry can include, at operation 480, whether the signal peaks that are detected meet an expected number of peaks. If the answer is no, and more signal peaks should be measured and potentially cancelled, the processing logic moves to operation 430 to continue with cascading peak cancellation. If the answer is yes at operation 480, the processing logic moves to operations 450 and 460, as was just discussed, in terminating the cascading peak cancellation and reporting detected signal peaks.

In at least some embodiments, the expected number of peaks may be determined based on one of probabilities corresponding to previously detected peaks of a detection function or a number of detected paths to and from the first object. More specifically, the processing logic can determine, using a location tracking algorithm, the probabilities corresponding to the previously detected signal peaks based on matching currently detected peaks of the detection function with previously detected peaks of the detection function. Thus, a location tracking algorithm (executable by the processor 120) may assign a probability to each detected object and track this probability against newly detected peaks. Also, the processing device can match previous peaks with new peaks at operation 480. Based on a newly detected state of an object and a list of previous states, the processing device can expect some number of peaks within the signal peaks of the data array. As each successive peak is detected and the last maximum peak canceled, the total number of detected peaks gets closer to the expected number of peaks, until the expected number of peaks is met and the cascading peak cancellation is terminated.

More specifically, there are variety of the location tracking algorithms that assign probability to each detected object (or path) and match current and previous peaks. The simplest case of single object tracking algorithm is a Kalman filter. An object detection algorithm looks at a current state only. To have a stop condition for object detection, location tracking information can be used. So, location tracking filters object location over time and location is determined from signal peaks. If there is high probability that some signal peaks are objects, this information can be used as a stop condition to the cascading peak cancellation. As a result, computation complexity can be managed and object detection need not pass amplitude information of peak detection to the location tracking algorithm, thus lowering location tracking algorithm complexity.

In at least some other embodiments, alternative or in addition to the probability tracking of expected peaks, the physical environment near the wireless device 100 is analyzed to determine whether an object is being detected based on a set of multipath distances, as illustrated in FIG. 5, e.g., defined by the number of multiple paths through with reflective signals arrive at the wireless device 100. Again, as each successive peak is detected and the last maximum peak canceled, the total number of detected multipath-related peaks gets closer to the expected number of peaks, until the expected number of peaks is met and the cascading peak cancellation is terminated.

FIG. 5 is a simplified diagram illustrating the generation of multipath distances due to reflection of RF signals from conductive object(s) according to some embodiments. FIG. 5 illustrates two different scenarios. A first scenario relates to a radar-like application that begins with an initiator 502 (FIG. 1A) and the second scenario involves two active wireless devices. In the first scenario, an incident RF signal transmitted by the initiator 502 reflects off of a conductive object 509 and then from a target reflector 550 and back again. In the second scenario, assume the initiator 502 of RF signals is included in the transmitter 102 of the wireless device 100, for example. The initiator 502 may transmit an RF signal and later switches to the receiver 104 mode (FIG. 1B) to detect a returned signal. In the first scenario (radar mode) the transmitter 102 and the receiver 104 are active simultaneously in order to detect a delayed version of the same signal. The difference between peaks of the radiated signal and the reflected signal may be processed to determine a location and/or velocity of the a reflector 550 or other target object. In some embodiments, however, there is also the conductive object 509 from which reflects both the radiated RF signal and the reflective RF signal, effectively generating multiple peaks corresponding to multipath distances based on the square of the number of paths, some of the them line-of-sight (LoS) and others non-LoS.

In the example of FIG. 5, there are two possible outgoing paths 510 and 520, where out-going path 510 is line-of-sight (LoS) and out-going path 520 bounces off the conductive object 509. Similarly, there are two possible reflective paths 512 and 522, where reflective path 512 is LoS and reflective path 522 bounces off of the conductive object 509. The number of peaks is smaller than the squared number of paths (in this case four paths) because of merging peaks that correspond to the same path distance, e.g., here LoS to the conductive object 509 or the conductive object 509 to LoS. Thus, the processing logic can determine that there are three peaks in the environment presented by that of FIG. 5, and thus be the expected number of peaks, as illustrated in FIG. 2. Note that the shortest path (LoS) relates to the distance between the wireless device and the object (passive object or similar wireless device).

With additional reference to FIG. 2, if maxima in GCC data array (e.g., spectrum C(d) or heat map C(d,v)) are caused by a target object or an active wireless device in a multipath environment, the method 400 includes a number of advantages. For example, the processing logic can distinguish several paths associated with a single peak in a multipath situation such as illustrated in FIG. 5. Further, the processing logic can shift peaks in the correct direction because of compensation for previous peaks. By shifting peaks in the correct direction, calculated weighted vectors can more accurately cancel the next maximum (or highest) peak. Also, the processing logic can perform regular peak detection for sufficient separation, e.g., where there are no side effects (e.g., no shifting).

Figure 6:
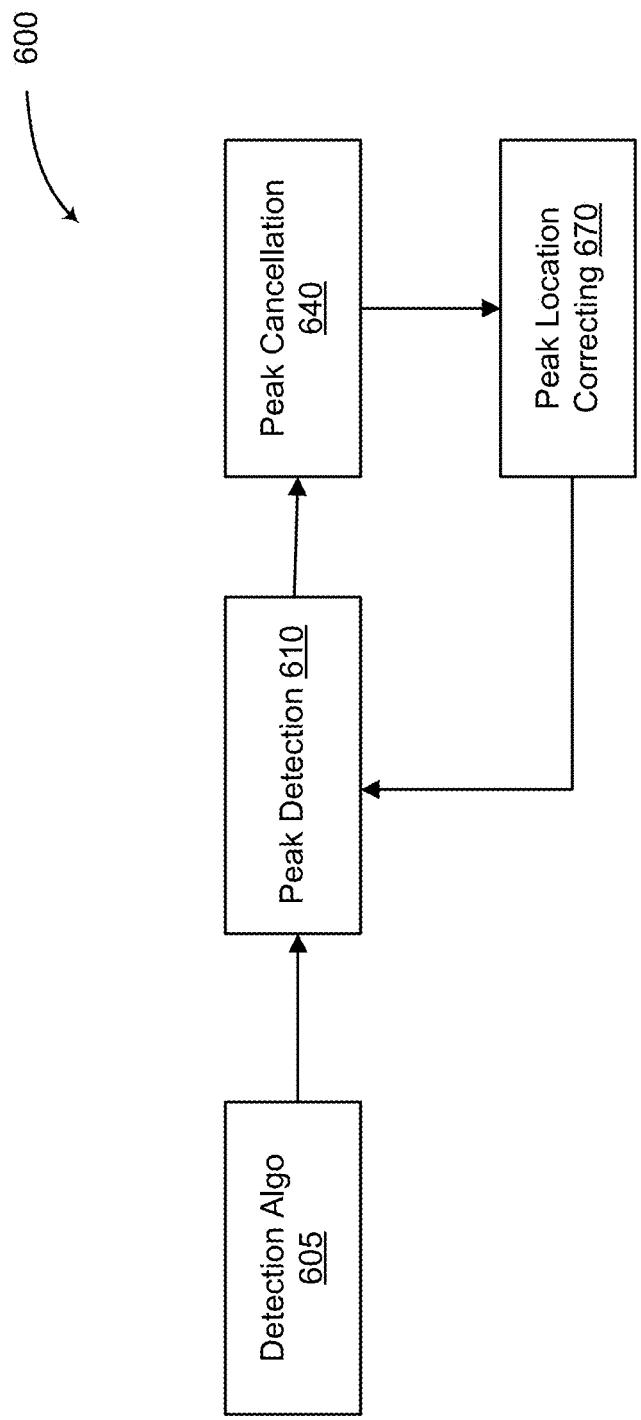
FIG. 6 is a flow diagram of an example method for cascading peak cancellation together with peak location correcting in accordance with some implementations.

FIG. 6 is a flow diagram of an example method 600 for cascading peak cancellation together with peak location correcting in accordance with some implementations. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the wireless device 100, to include the communication interface 106 and/or the processor 120 (e.g., processing device).

At operation 605, the processing logic performs a detection algorithm on the received RF signal, which in some embodiments of passive detecting, is a reflective RF signal. The detection algorithm may include one or more of GCC, IFFT, or MUSIC, for example. The GCC algorithm, for example, may generate a GCC spectrum or data array containing multiple signal peaks.

At operation 610, the processing logic detects or otherwise identifies a maximum peak among the multiple peaks and determines a distance and/or velocity associated with the maximum peak. For example, this distance (or coordinates) may be d1 in FIG. 2, or vi (velocity, or distance over time). In some embodiments, operations 420 and 430 may also be performed.

At operation 640, the processing logic performs peak cancellation, e.g., by applying successively computed steering functions (C (d), C' (d), C'' (d), . . . ) that employ these successively computed steering vectors, $s_w(d)$, using the vector projections calculated in operation 430. This cancellation provides an iterative modification to the RF data array, where at each iteration, the maximum peak of the multiple signal peaks is cancelled, e.g., so that each successively next-highest peak can more easily be detected.

At operation 670, the processing logic corrects the peak location, e.g., associated with the object detection algorithm that the processing logic executes. A-spatially, method 400 is efficient for randomly-selected frequencies. The method 400 can further solve cases for "bad" frequencies that generate multiple peaks. Optionally, the processing device can correct a peak location (at operation 670) using intrinsic properties of signal propagation in forward and backward directions (see FIG. 5). Thus, the processing logic can detect distance relation between several peaks. For example, in the case of two paths, the middle peak might be exactly in between two other signal peaks, e.g., a largest peak 201 in FIG. 2 is between two other lesser peaks, a right peak 205 and a left peak 215. So, if the left peak 215 is the smallest, it can be corrected as expressed in Equation (6).

$$\hat{r}_1 = w \cdot r_1 + [1-w] \cdot [r_2 - (r_3 - r_2)] \quad (6)$$

where $\hat{r}_1$ is a corrected distance of the largest peak 201 (or original maximum peak), $r_1 < r_2 < r_3$ are estimated distances, and w is a weight to merge measured and expected locations of the largest peak 201. This may be done because the left peak 215 corresponds to a shortest path (LoS) and determines the distance to the object (or second wireless device). With reference to FIG. 2, therefore, the left peak 215 may be shifted to be equidistant to the largest peak (which is the middle peak) compared to the right peak 205. In some embodiments, therefore, the processing logic can determine a distance relation between at least two signal peaks detected within the multiple signal peaks. The processing logic can then merge the measured and expected locations of a first peak of the at least two signal peaks into a second peak of the at least two signal peaks, to correct the location of the first peak. Thus, correcting of peak location in object detection is illustrated FIG. 7 and may be done after peak detection and cancelation.

Figure 7:
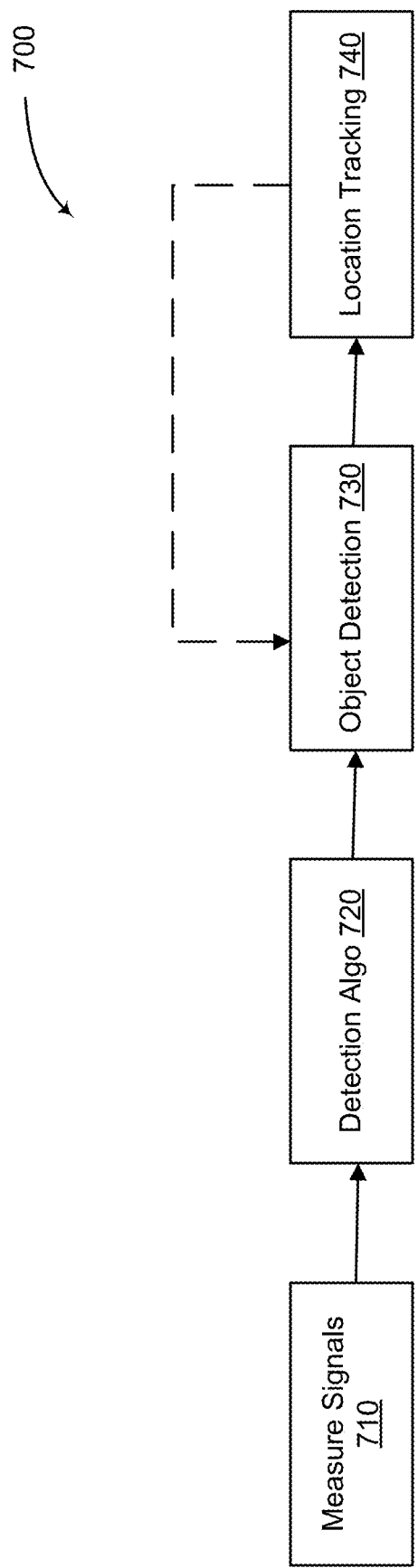
FIG. 7 is a flow diagram of a method of objection detection combined with location tracking of detected objects according to various embodiments.

FIG. 7 is a flow diagram of a method 700 of objection detection combined with location tracking of detected objects according to various embodiments. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the wireless device 100, to include the communication interface 106 and/or the processor 120 (e.g., processing device).

At operation 710, the processing logic measures signals, e.g., reflective RF signals received back from an environment of the wireless device 100. The measured signals may be used to calculate a likelihood spectrum C(d) or heat map C(d,v) that contains peaks with information about distance to passive objects, about multipaths between wireless devices, or about multipaths between a wireless device and a passive object.

At operation 720, the processing logic performs a detection algorithm on the measured signals, e.g., the measured RF spectrum. The detection algorithm may include one or more of GCC, IFFT, or MUSIC, for example. The GCC algorithm, for example, may generate a GCC spectrum containing multiple signal peaks.

At operation 730, the processing logic perform objects detection, e.g., via the cascading peak cancellation and other operations discussed with reference to FIG. 4. The objection detection can identify one or more objects or one or more peaks based on multipath distances and provides values for localization to the location tracking operation 740.

At operation 740, the processing logic performs location tracking of one or more objects that were detected at operation 730. As discussed, location tracking filters object location over time and location is determined from signal peaks. Location tracking may also correct actual position of device (or objects). Location tracking may provide a number of expected peaks to the object detection algorithm (or object detection logic) being performed at operation 730 (see dashed line feeding back the expected number of peaks).

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C/PD mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A device comprising:
   a transmitter coupled to at least one antenna;
   a receiver coupled to the at least one antenna; and
   a processing device coupled to the transmitter and the receiver, the processing device to:
   cause the transmitter to radiate a radio frequency (RF) signal;
   receive, via the receiver, a reflective RF signal based on the radiated RF signal;
   detect, within a data array of the reflective RF signal, a maximum peak among a plurality of signal peaks, the maximum peak being indicative of a first distance to a first object relative to the at least one antenna; and
   cancel, using cascading peak cancellation on the data array, the maximum peak while detecting a first next-highest peak of the plurality of signal peaks compared to the maximum peak, the first next-highest peak being indicative of a second distance to a second object.

2. The device of claim 1, wherein the processing device is further to generate the data array, from the reflective RF signal, comprising information about a likelihood of objects being located at different distances, wherein, to detect the maximum peak, the processing device is to apply a detection function to the data array.

3. The device of claim 1, wherein the processing device is further to:
   determine whether the first next-highest peak has an amplitude satisfying a threshold amplitude; and
   in response to the amplitude not satisfying the threshold amplitude, report the maximum peak as correlating to the first distance and terminate the cascading peak cancellation.

4. The device of claim 1, wherein, to detect and cancel the maximum peak, the processing device is to:
   locate the maximum peak by applying a first steering vector, within a first detection function, to the data array that correlates to the first distance;
   determine the second distance associated with the first next-highest peak that correlates to a second steering vector; and
   remove, using the second steering vector, the maximum peak from the data array.

5. The device of claim 4, wherein, to detect the first next-highest peak, the processing device is further to:
   remove a weight associated with the first distance from a search set of the first steering vector to generate a weighted search set; and
   integrate the weighted search set into the second steering vector to generate a second detection function, wherein the second detection function is equivalent to the first distance multiplied by the weight to a determined power.

6. The device of claim 1, wherein the processing device is further to:
   determine that the first next-highest peak has an amplitude that satisfies a threshold amplitude; and
   cancel, using the cascading peak cancellation, the first next-highest peak of the plurality of signal peaks while detecting a second next-highest peak of the plurality of signal peaks, the second next-highest peak being indicative of a third distance to a third object.

7. The device of claim 6, wherein, to detect and cancel the first next-highest peak, the processing device is further to:

locate the first next-highest peak by applying a second steering vector, within a second detection function, to the data array that generates the second distance; and determine the third distance associated with the second next-highest peak using a weighted search set, within a third detection function, that also removes the first next-highest peak from the data array; and wherein, to detect the second next-highest peak, the processing device is further to generate the third detection function by one of:

multiplying, by the first distance, a product of the square of a first steering vector used to determine the first distance and the square of a second steering vector used to determine the second distance; or multiplying, by the first distance, a difference between the second distance and the first distance.

8. A method comprising:

detecting, within a data array of a reflective radio frequency (RF) signal, a maximum peak among a plurality of signal peaks, the maximum peak being indicative of a first path distance to a first object relative to an RF wireless device, the first path being one of multiple paths reflective to or from the first object;

determining that an amplitude of the maximum peak satisfies a threshold amplitude that is defined by a noise floor; and canceling, using cascading peak cancellation on the data array, by the RF wireless device, the maximum peak while detecting a first next-highest peak of the plurality of signal peaks compared to the maximum peak, the first next-highest peak being indicative of a second path distance to the first object.

9. The method of claim 8, further comprising generating the data array by the RF wireless device from the reflective RF signal, the data array comprising information about a likelihood of objects being located at different path distances, wherein the detecting comprises applying a detection function to the data array.

10. The method of claim 8, further comprising:

determining whether the first next-highest peak has an amplitude satisfying a threshold amplitude; and in response to the amplitude not satisfying the threshold amplitude, reporting the maximum peak as correlating to the first path distance and terminating the cascading peak cancellation.

11. The method of claim 8, wherein detecting and canceling the maximum peak further comprises:

locating the maximum peak by applying a first steering vector, within a first detection function, to the data array that correlates to the first path distance;

determining the second path distance associated with the first next-highest peak that correlates to a second steering vector; and removing, using the second steering vector, the maximum peak from the data array.

12. The method of claim 11, wherein detecting the first next-highest peak further comprises:

removing a weight associated with the first path distance from a search set of the first steering vector to generate a weighted search set; and integrating the weighted search set into the second steering vector to generate a second detection function, wherein the second detection function is equivalent to the first path distance multiplied by the weight to a determined power.

13. The method of claim 8, further comprising:

determining that the first next-highest peak has an amplitude that satisfies a threshold amplitude; and canceling, using the cascading peak cancellation, the first next-highest peak of the plurality signal peaks while detecting a second next-highest peak of the plurality of signal peaks, the second next-highest peak being indicative of a third path distance to the first object.

14. The method of claim 13, wherein detecting and canceling the first next-highest peak further comprises:

locating the first next-highest peak by applying a second steering vector, within a second detection function, to the data array that generates the second path distance; and determining the third path distance associated with the second next-highest peak using a weighted search set, within a third detection function, that also removes the first next-highest peak from the data array; and wherein detecting the second next-highest peak further comprises generating the third detection function by one of:

multiplying, by the first distance, a product of the square of a first steering vector used to determine the first path distance and the square of a second steering vector used to determine the second path distance; or multiplying, by the first path distance, a difference between the second path distance and the first path distance.

15. A method comprising:

detecting, within a data array of a radio frequency (RF) signal returned by one or more wireless devices, a maximum peak among a plurality of signal peaks, the maximum peak being indicative of a first path distance to a wireless device relative to a detecting RF wireless device;

determining that an amplitude of the maximum peak satisfies a threshold amplitude that is defined by a noise floor;

determining an expected number of peaks among the plurality of signal peaks based on one of probabilities corresponding to previously detected peaks or a number of detected paths to and from the wireless device;

determining that the expected number of peaks have not yet been detected; and canceling, using cascading peak cancellation on the RF signal, the maximum peak while detecting a first next-highest peak of the plurality of signal peaks compared to the maximum peak, the first next-highest peak being indicative of a second path distance to the wireless device.

16. The method of claim 15, further comprising:

determining that the expected number of peaks have been detected; and responsive to detecting the expected number of peaks:

reporting the maximum peak as correlating to the first path distance; and terminating the cascading peak cancellation.

17. The method of claim 15, further comprising:

determining, using a location tracking algorithm, the probabilities corresponding to the previously detected peaks based on matching currently detected peaks with previously detected peaks; and providing the expected number of peaks to object detection logic.

18. The method of claim 15, further comprising:

determining a distance relation between at least two signal peaks detected within the plurality of signal peaks; and merging measured and expected locations of a first peak of the at least two signal peaks into a second peak of the at least two signal peaks, to correct a location of the first peak.

19. The method of claim 15, further comprising:
determining whether the first next-highest peak has an amplitude satisfying the threshold amplitude; and
in response to the amplitude not satisfying the threshold amplitude:
ignoring the first next-highest peak;
reporting the maximum peak as correlating to the first path distance; and
terminating the cascading peak cancellation.

20. The method of claim 15, further comprising:
distinguishing multiple paths associated with a single peak of the plurality of signal peaks; and
determining the expected number of peaks based on the multiple paths.

* * * * *